United States Patent [19]
Ohira et al.

[11] Patent Number: 6,039,912
[45] Date of Patent: Mar. 21, 2000

[54] FABRICATION METHOD FOR HOUSING STRUCTURE FOR PROJECTION TYPE TELEVISION RECEIVERS

[75] Inventors: Tadashi Ohira, Kobe; Yoshiaki Sato, Takatsuki; Kazuhiko Kodama, Kyoto, all of Japan

[73] Assignee: Matsushita Electric Industrial Co., Ltd., Osaka, Japan

[21] Appl. No.: 09/149,580

[22] Filed: Sep. 8, 1998

Related U.S. Application Data

[62] Division of application No. 08/898,534, Jul. 22, 1997.

[30] Foreign Application Priority Data

Jul. 22, 1996 [JP] Japan .................................. 8-191891

[51] Int. Cl.[7] ...................................................... B29C 45/37
[52] U.S. Cl. ....................... 264/328.1; 312/7.2; 348/836; 353/74
[58] Field of Search ............................. 264/328.1, 328.8, 264/318; 425/577; 348/5, 836; 312/7.2; 359/460; 353/74; 29/428, 456, 525.12

[56] References Cited

U.S. PATENT DOCUMENTS 5,294,385  3/1994  Hirota .................................. 264/328.8
5,387,096  2/1995  Wieser .................................... 425/577
5,629,745  5/1997  Naito et al. ............................. 264/572
5,656,307  8/1997  Naito et al. ........................... 264/328.8
5,786,933  7/1998  Iwai et al. .............................. 359/460

FOREIGN PATENT DOCUMENTS 3-16776    2/1991   Japan .
4-116844  10/1992   Japan .
8-107537   4/1996   Japan .

*Primary Examiner*—Jill L. Heitbrink
*Attorney, Agent, or Firm*—Ratner & Prestia

[57] ABSTRACT

A housing structure for projection type television receivers comprises a casing provided with an opening on each of the front side and the back side, a framework holding a screen and a back cover. The framework for holding the screen is installed on the front side of the casing. The back cover is installed on the back side of the casing. Concaved members for mating with bosses that are used to mount the framework are formed on the outer rim of the front side of the casing. Reinforcing ribs and guide ribs that are used to mount the back cover are formed on the back side of the casing. The housing structure disclosed here makes it possible to mount and detach the screen, working from the outside of the housing structure.

5 Claims, 17 Drawing Sheets

FABRICATION METHOD FOR HOUSING STRUCTURE FOR PROJECTION TYPE TELEVISION RECEIVERS

This application is a division of U.S. patent application Ser. No. 08/898,534, filed Jul. 22, 1997.

FIELD OF THE INVENTION

The present invention relates to projection type television receivers whereby video images are optically enlarged and projected on a light transmission type screen for displaying the video images, and more specifically relates to a housing structure of such projection type television receivers and its fabrication method.

BACKGROUND OF THE INVENTION

In order to save transportation costs, a housing structure of rear projection type television receivers is designed to package individually a screen, a casing separated between an upper part and a lower part, a back cover and the like, thereby achieving the smallest possible volume as a whole. In addition, there is provision for dismounting the screen easily to facilitate maintenance services such as screen replacement and the like.

Therefore, the housing structure of the prior art projection type television receivers whereby video images are optically enlarged and projected on a light transmission type screen comprises a cabinet with a plurality of bosses formed on the periphery of the front opening thereof and with a plurality of bosses formed inside of the rim of the back thereof and a back cover with screw pits formed on the rim thereof.

The light transmission type screen is fixed to the inside of the cabinet's rim by means of thrusting members before the back cover is put in place.

FIG. 17 is a perspective view of a prior art projection type television receiver.

FIG. 18 and FIG. 19 show detailed structures of part of the back of the foregoing projection type television receiver.

In FIG. 18 and FIG. 19, a screen 21 is pressed against the inside of the front surface's rim of a cabinet 23 by means of thrusting members 22.

The thrusting members 22 are fixed to a plurality of bosses 23b, which are formed on the inside periphery of a front opening 23a and the rest of the front surface of the cabinet 23, and bosses 23c, which are formed inside of the rim of the back of the cabinet 23, by means of screws 24. In order to reinforce the corners of the cabinet 23, "U" letter shaped reinforcing members 25 are fixed to the bosses 23c by means of screws 26.

FIG. 19 shows how the reinforcing members 25 are mounted on the bosses 23c of the cabinet 23 by means of the screws 26.

As illustrated in FIG. 17, the prior art casing is fixed to the casing's lower part 29 from the upper back thereof before a back cover 27 is put in place.

FIG. 20 is a cross-sectional view of the area where the back cover 27 is put together with the cabinet 23.

In FIG. 20, the back cover 27 provided with screw pits 27a is fixed to the cabinet 23 mounted on the casing's lower part 29 through the bosses 23c formed on the back of the outer rim of the cabinet 23 by means of screws 28.

Thus, the prior art cabinet made of resin is structured in such a way that maintenance and checks including replacement of screens and the like are performed only after the back cover 27 is removed.

Therefore, with large screen projection type television receivers of the conventional structure as described in the above, the work of screen exchange, maintenance and checks requires a removal of the back cover when scars are formed on the screen surface and checks are found necessary due to a long period of screen use. When it comes to replacing a screen, it is necessary first to remove the back cover 27 and then follows a work to remove screws 24 from the back of the casing carried out entirely inside of the cabinet 23. For the above work, the whole television receiver has to be moved to make a sufficient space. As a result, it has not been easy to carry out the foregoing maintenance work such as screen exchange and the like in terms of time and man power.

Moreover, during the course of assembly work in the factory and also at the time of delivery, the cabinet and back cover are attached to the housing structure only after the screen is put in place, thus resulting in problems of increased work steps and reduced productivity. In addition, the worldwide interest in environmental issues requires products that facilitate recycling of the materials used in the products. From this point of view, the conventional projection type television receivers are not readily dismantled for further steps of material recycling.

Furthermore, with the cabinet of the prior art structure, it is difficult for the existing resin molding technology to produce a heavy wall thickness that is required to keep a sufficient mechanical strength for the opening at the side of the cabinet where the back cover is attached. Because of this problem, reinforcement metal fixtures are used to maintain a sufficient strength without incorporating a heavy wall thickness in the cabinet.

SUMMARY OF THE INVENTION

A housing structure of the present invention for projection type television receivers comprises a lower cabinet containing a first function unit whereby video images are projected and an upper cabinet placed on top of the foregoing lower cabinet and securely put together therewith. The foregoing upper cabinet includes:

i) a casing with a first opening formed on the front side thereof, a second opening formed on the back side thereof and a second function unit encased therein;

ii) a square-shaped framework installed on the front side of the foregoing casing and provided with a third opening;

iii) a screen installed between the foregoing framework and casing so as to cover the third opening; and iv) a back cover installed on the back side of the casing so as to cover the second opening.

The foregoing framework is made detachable from the casing. The screen is made detachable from the framework. The back cover is made detachable from the casing. The aforementioned casing is shaped almost like a box having a short depth dimension. The back cover presents a length in circumference, which becomes shorter than that of the casing as the distance from the casing increases in the backward direction, thereby making the foregoing upper cabinet look slim in an outward appearance.

The framework and back cover are mountable and also detachable through the front side of the casing and the screen is, in addition, made mountable and also detachable as the foregoing framework is mounted and detached.

According to the structures as described in the above, the required work time is made shorter in the product assembly work at factory and also at the time of delivery to customers, in the work of maintenance and checks when products are out of order, and in the work of dismantling for a recycling purpose, with a further contribution to bringing about such effects as reducing work steps and the like. Particularly, when a projection type television receiver has to be repaired in the households where the television receiver is installed, it is not needed to move the whole projection type television receiver. The framework can be readily detached from or mounted on the casing from the front side of the cabinet, thereby making it extremely easy to replace a screen and the like. Furthermore, the projection type television receivers are made slim in an outward appearance.

A housing structure of the present invention for projection type television receivers comprises a lower cabinet containing a first function unit whereby video images are projected and an upper cabinet placed on top of the foregoing lower cabinet and securely put together therewith. The foregoing upper cabinet includes:

i) a casing with a first opening formed on the front side thereof and a second function unit encased therein;

ii) a square-shaped framework installed on the front side of the foregoing casing and provided with a third opening;

iii) a screen fixed to the foregoing framework and installed between the framework and the casing.

The framework is mountable and also detachable through the front side of the casing and the screen is, in addition, made mountable and also detachable as the foregoing framework is mounted and detached. Particularly preferred in the above is that the foregoing casing and framework are made of molded resin, respectively.

According to the structures as described in the above, the work time required in product assembly work at factory and also at the time of delivery to customers, in the work of maintenance and checks when products are out of order, and in the work of dismantling for recycling purposes is made shorter, with a further contribution to bringing about such effects as a work steps reduction and the like. Particularly, when a projection type television receiver has to be repaired in the households where the television receiver is installed, it is not required to move the whole projection type television receiver. The framework can be readily detached from or mounted on the casing from the front side of the cabinet, thereby making it extremely easy to replace a screen and the like.

Particularly preferred in the foregoing structure is that the casing has ribs, which have a U letter shaped cross-section, formed on the front side of the rim thereof, the framework has bosses formed on and projecting from the back surface thereof and the bosses are engaged in the foregoing ribs, thereby the framework getting fixed onto the casing. Thus, not only the above effect of fixing the framework securely onto the casing is achieved but also the work of mounting and demounting the framework on and from the casing, respectively, is made extremely easy.

Further, particularly preferred in the foregoing structure is that the casing has concaved screw accepting means formed on the back side thereof opposite to the foregoing ribs and screws are inserted from the screw accepting means side piercing the bosses and ribs, thereby the framework getting securely fixed onto the casing. Thus, not only the above effect is achieved but also the framework is securely fixed onto the casing.

Still further, particularly preferred is that when the framework is demounted from the casing it is made possible for the upper cabinet to be detached from the lower cabinet by working from the inside of the casing. Thus, not only the above effect is achieved but also the work of mounting and demounting the upper cabinet on and from the casing, respectively, is made extremely easy.

Still further, particularly preferred in the foregoing structure is that the casing has a back cover formed on the back side thereof with the casing and back cover being molded in one piece. Thus, not only the above effect is achieved but also an assembly work of the back cover and casing is made unnecessary, thereby reducing work steps in production.

Still further, particularly preferred is that the casing has a second opening formed on the back side thereof and, in addition, a back cover is formed on the back side of the casing, covering the second opening. Thus, not only the above effect is achieved, but also a volume at the time of transportation is reduced, thereby cutting transportation costs.

A housing structure of the present invention for other projection type television receivers comprises a lower cabinet containing a first function unit whereby video images are projected and an upper cabinet placed on top of the foregoing lower cabinet and securely put together therewith. The foregoing upper cabinet includes:

i) a casing with a first opening formed on the front side thereof, a second opening formed on the back side thereof and a second function unit encased therein;

ii) a square-shaped framework installed on the front side of the foregoing casing and provided with a third opening;

iii) a screen covering the foregoing third opening and installed between the framework and the casing; and iv) a back cover covering the foregoing second opening and installed on the back side of the casing.

The framework is mountable and also detachable by working from the front side of the casing and the screen is, in addition, made mountable and also detachable as the foregoing framework is mounted and detached. According to the structures as described in the above, the work time required in product assembly at factory and also at the time of delivery to customers, in the work of maintenance and checks when products are out of order, and in the work of dismantling for recycling purposes is made shorter, with a further contribution to bringing about such effects as a work steps reduction and the like. Particularly, when a projection type television receiver has to be repaired in the households where the television receiver is installed, it is not required to move the whole projection type television receiver. The framework can be readily detached from or mounted on the casing from the front side of the cabinet, thereby making it extremely easy to replace a screen and the like.

Particularly preferred in the above structure is that the first function unit has a device whereby video images are displayed and a device whereby the foregoing video images are enlarged and projected, the second function unit has a reflector whereby the foregoing video images are reflected and projected on the afore-mentioned screen and the reflector is installed in the front section of the casing. Thus, not only the above effects are achieved but also adjustment of the reflector's position can be made easily according to the position and angle of the optics system and also the size of the screen.

Further, particularly preferred in the above structure is that when the framework is demounted from the casing it is made possible for the upper cabinet to be attached on and detached from the lower cabinet with the work performed inside of the casing. Thus, not only the above effect is achieved but also the work of mounting and demounting of the upper cabinet on and from the casing, respectively, is made extremely easy.

Still further, particularly preferred in the above structure is that the first function unit has a device whereby video images are displayed and a device whereby the foregoing video images are enlarged and projected and the second function unit has a reflector whereby the foregoing video images are reflected and projected on the afore-mentioned screen. When the framework is demounted from the casing, it is made possible for the reflector to be mounted on and detached from the casing, respectively, with such work being performed from the front side of the casing. Thus, not only the above effect is achieved but also the work of mounting and demounting of the reflector on and from the casing, respectively, is made extremely easy. Furthermore, when the casing has some dimensional tolerances, it becomes extremely easy to conduct angular adjustments of the reflector.

Still further, particularly preferred in the above structure is that the foregoing casing has first means for mating with bosses formed on the edge of the first opening's outer rim and second means for mating with bosses formed on the edge of the second opening's inner rim. The framework has first bosses formed on the edge of the third opening. The back cover has second bosses formed on the periphery thereof. The first bosses are fitted with the first means for mating with bosses so that the framework can be mounted on and detached from the front side of the casing through the front side thereof. The second bosses are fitted with the second means for mating with bosses so that the back cover can be mounted on and detached from the back side of the casing through the front side thereof. Thus, not only the above effects are achieved but also the work of mounting and demounting the framework and back cover on and from the casing, respectively, is made extremely easy. Furthermore, the fit between the casing and both the framework and back cover is made extremely strong.

Still further, particularly preferred in the above structure is that the casing has reinforcing ribs formed on the edge of the inner rim of the second opening, which is provided on the back side of the casing, so as to be protruding inward and guide ribs formed on the reinforcing ribs. The reinforcing ribs are effective in strengthening the back side of the casing. The back cover can be fitted with the casing by being moved along the guide ribs. Thus, not only the above effects are achieved, but also the work of mounting and demounting of the back cover on and from the casing, respectively, becomes extremely easy. Moreover, the strength of the opening on the back side of the casing is increased by means of reinforcing ribs, resulting in the prevention of deformation of the casing's back side.

Still further, particularly preferred in the above structure is that the casing has "U" letter shaped ribs formed on the inner rim's top side, left side and right side of the first opening and also guide ribs formed on the inner rim's bottom side with the framework put in place by being fitted with the ribs and guide ribs. Thus, not only the above effect is achieved, but also the work of mounting and demounting of the framework on and from the casing, respectively, becomes extremely easy.

Still further, particularly preferred in the above structure is that the casing has a wall thickness made heavier on the back side thereof than on the front side and the back cover is fixed on the back side of the casing where the wall thickness is large. Thus, not only the above effect is achieved, but also the strength of the opening on the back side of the casing is intensified, resulting in the prevention of deformation in the casing's back side.

Still further, particularly preferred in the above structure is that the casing has a heavier wall thickness on the back side thereof than on the front side and is fabricated by resin molding using a molding die. The casing is fabricated in such a way as the casing's first opening is located on the core part of the molding die, the casing's second opening is located on the cavity part of the molding die and the casing's bottom side is located on the side core part of the molding die. Thus, not only the above effects are achieved, but also a casing having a heavier wall thickness on the back side thereof than on the front side can be easily fabricated. Therefore, any additional reinforcing materials are not required separately.

Still further, particularly preferred in the above structure is that the casing has "U" letter shaped ribs formed on the inner rim's top side, left side and right side of the first opening and also guide ribs formed on the inner rim's bottom side. The casing has a heavier wall thickness on the back side thereof than on the front side. The casing is fabricated by resin molding using a molding die. The casing is fabricated in such a way as the casing's first opening is located on the core side of the molding die, the casing's second opening is located on the cavity side of the molding die and the casing's bottom side provided with the guide ribs is located on the side core side of the molding die. Thus, not only the above effects are achieved, but also a casing having guide ribs on the bottom thereof and a heavier wall thickness on the back side thereof can be easily fabricated.

A housing structure of the present invention for other projection type television receivers comprises a lower cabinet containing a first function unit whereby video images are projected and an upper cabinet placed on top of the foregoing lower cabinet and securely put together therewith. The foregoing upper cabinet includes:

i) a casing with a first opening formed on the front side thereof and a second function unit encased therein;

ii) a square-shaped framework installed on the front side of the foregoing casing and provided with a third opening;

iii) a screen covering the foregoing third opening and installed between the framework and the casing; and iv) fixing members that press and fix the screen on the framework.

The framework has bosses that are formed on and protruding from the back side of the framework. The casing has concaved ribs formed on the front side of the outer rim thereof. Areas around the perimeter of the screen are sandwiched between first edges of the fixing members and the framework and fixed there. The bosses of the framework and the ribs of the casing are engaged with one another having second edges of the fixing members sandwiched in between.

According to the structures as described in the above, the work time required in product assembly work at factory and also at the time of delivery to customers, in the work of maintenance and checks when products are out of order, and in the work of dismantling for recycling purposes is made shorter, with a further contribution to bringing about such effects as a work steps reduction and the like. Particularly, when a projection type television receiver has to be repaired in the households where the television receiver is installed, it is not required to move the whole projection type television receiver. The framework can be readily detached from or mounted on the casing from the front side of the cabinet, thereby making it extremely easy to replace a screen and the like. In addition, the work of mounting and detaching of the framework and screen on and from the casing becomes extremely easy. Moreover, the fixing strength between the casing and the framework and screen is greatly intensified.

Particularly preferred in the above structure is that the casing has additional bosses that are formed on and protruding from the back side of the casing and the fixing members have holes formed at specified positions. The foregoing additional bosses are fitted in the holes of the fixing members, thereby the fixing members getting fixed to the framework with the screen sandwiched in between. Thus, the effect of intensifying the fixing strength as intended is multiplied.

Further, particularly preferred in the above structure is that the fixing members have configurations that combine "U" letter-like and "L" letter-like shapes, edges of the "L" letter-like shapes make the foregoing first edges and edges of the "U" letter-like shapes make the foregoing second edges. The bosses of the framework fit in the recesses of the "U" letter-like shapes and the "U" letter-like shapes of the fixing members fit in the foregoing ribs of the casing. Thus, the effect of intensifying the fixing strength as intended is multiplied.

Still further, particularly preferred in the above structure is that the casing has first through holes formed in the recesses of the foregoing ribs. Also, the fixing members have second through holes formed in the "U" letter like shapes. Screws are fastened on the foregoing bosses of the framework after passing through the first through holes and second through holes, thereby the framework, fixing members and casing being put together securely with the screen sandwiched in between. Thus, the effect of intensifying the fixing strength as intended is multiplied.

A fabrication method of the present invention is used to fabricate a housing structure for a projection type television receiver comprising:

i) a casing with a first opening formed on the front side thereof, a second opening formed on the back side thereof and a function unit encased therein;

ii) a square-shaped framework installed on the front side of the foregoing casing and provided with a third opening;

iii) a screen installed between the foregoing framework and casing so as to cover the third opening; and iv) a back cover installed on the back side of the casing so as to cover the second opening.

The afore-mentioned fabrication method is based on resin molding using a molding die. The casing is fabricated in such a way as the casing's first opening is located on the core side of the molding die, the casing's second opening is located on the cavity side of the molding die and the casing's bottom side is located on the side core side of the molding die.

Thus, a housing structure having the foregoing effects can be fabricated easily. As a result, low fabrication costs are realized.

Particularly preferred in the above structure is that the casing has a heavier wall thickness on the back side thereof than on the front side and has "U" letter shaped ribs formed on the inner rim's top side, left side and right side of the first opening and also guide ribs formed on the inner rim's bottom side. Thus, the effects as described in the above are multiplied.

BRIEF DESCRIPTION OF THE DRAWINGS

FIG. 6b and FIG. 6c are magnified views of portions of the casing shown in FIG. 6a.

DETAILED DESCRIPTION OF PREFERRED EMBODIMENTS OF THE INVENTION

Next, some exemplary embodiments of the present invention will be explained.

Exemplary Embodiment 1

Figure 1:
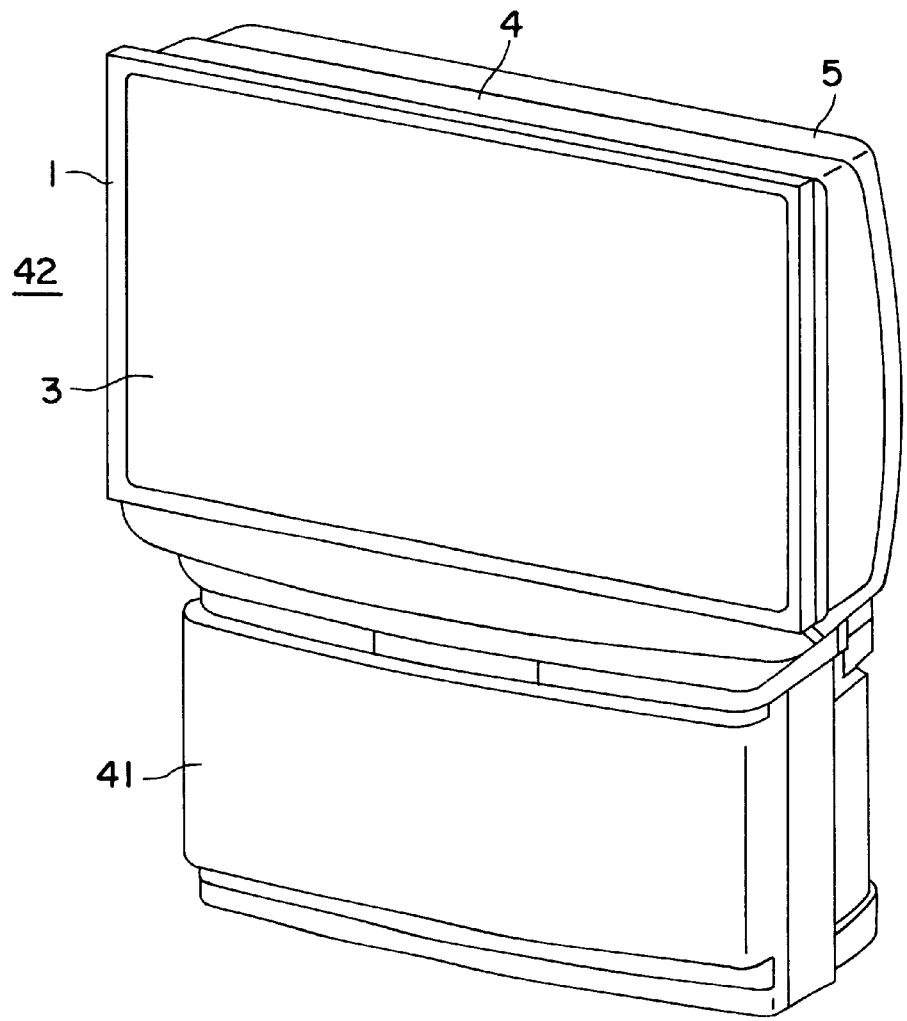
FIG. 1 is a perspective view of a housing structure for projection type television receivers in an exemplary embodiment of the present invention.

FIG. 1 is a perspective view of a housing structure for projection type television receivers in an exemplary embodiment of the present invention.

Figure 2:
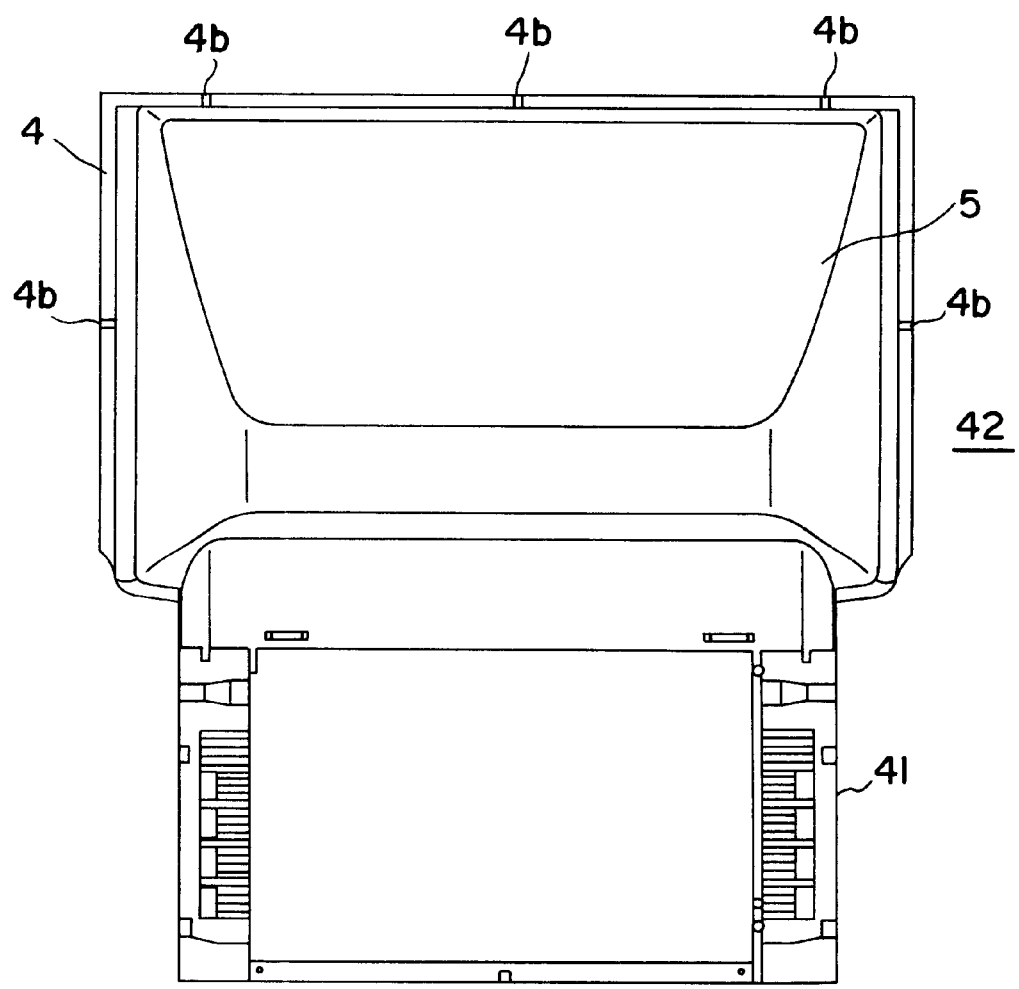
FIG. 2 is a front view of the back side of the housing structure for projection type television receivers as shown in FIG. 1.

FIG. 2 is a front view of the back side of the housing structure for projection type television receivers as shown in FIG. 1.

In FIG. 1 and FIG. 2, each respective projection type television receiver has a lower cabinet 41 and an upper cabinet 42 installed on top of the lower cabinet 41. The upper cabinet includes a casing 4, a framework 1 installed on the front side of the casing 4, a screen 3 attached to the framework 1 and a back cover 5 installed on the back side of the casing 4. Alternatively, the casing 4 and back cover 5 may be formed as a single integrated unit. The upper cabinet 42 is fixed on the lower cabinet 41 with a mechanical linkage established between the two cabinets. More specifically, the casing 4 of the upper cabinet 42 is fixed on the lower cabinet 41 with a mechanical linkage established between the casing 4 and the lower cabinet 41. Inside of the lower cabinet 41 is installed a first function unit comprising a device, whereby video images are displayed, and a device, whereby the foregoing video images are enlarged and projected.

Inside of the casing 4 is installed a second function unit comprising a reflector, whereby the foregoing video images are reflected and projected on the screen 3, and the like. The casing 4 is shaped almost like a box, having a first opening formed on the front side thereof and a second opening formed on the back side thereof.

The framework 1 is rectangle shaped, forming a third opening. The screen 3 is installed between the casing 4 and the framework 1, covering the third opening of the framework 1.

The framework 1 is installed on the front side of the casing 4, covering the first opening of the casing 4. The back cover 5 is installed on the back side of the casing 4, covering the second opening of the casing 4.

The framework 1 is installed so as to be detachable from the casing 4. The screen 3 is installed so as to be detachable from the framework 1. The back cover 5 is installed so as to be detachable from the casing 4. The casing 4 is thin in configurations having a short depth.

The back cover 5 is shaped like presenting a length in circumference, which becomes shorter than that of the casing 4 as the distance from the casing 4 increases in the backward direction. The framework 1 and back cover 5 are mountable on and also detachable from the front side of the casing 4.

The screen 3 is also made mountable and detachable as the framework 1 is mounted on and detached from the casing 4.

According to the structure as described in the above, a projection type television receiver having a slim outward appearance is realized.

In addition, the work of attaching and detaching a screen can be performed from the front side of the upper cabinet. Therefore, it is no longer needed to move the whole projection type television receiver that is big and heavy, facilitating the work of attaching and detaching the framework on and from the front side of the cabinet, respectively, to be performed easily. As a result, the work of replacing a screen and the like becomes simplified.

Furthermore, the required work time is made shorter in the product assembly work at factory and also at the time of delivery to customers, in the work of maintenance and checks when products are out of order, and in the work of dismantling for a recycling purpose, with a further contribution to bringing about such effects as reducing work steps and the like.

Exemplary Embodiment 2

Figure 3:
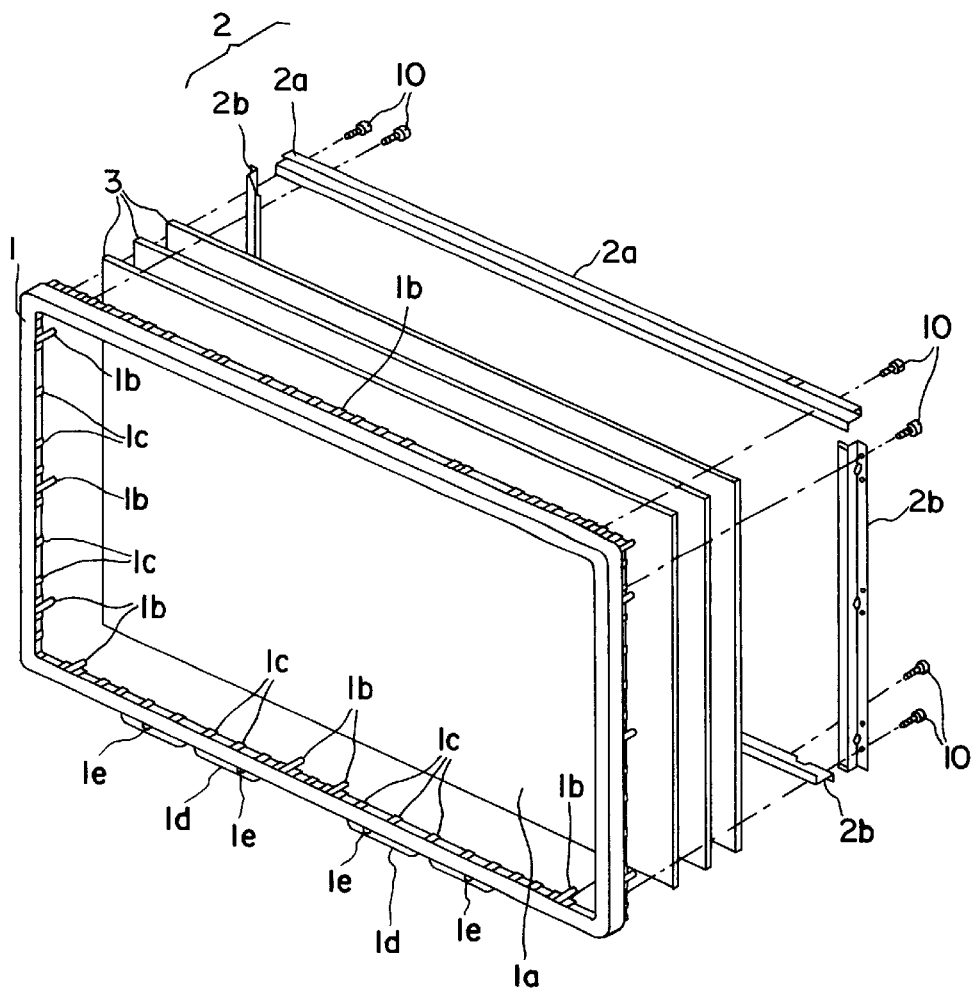
FIG. 3 is a perspective view to illustrate the structures involved with the framework for the housing structure as shown in FIG. 1.

FIG. 3 shows how the screen and framework are structured in the projection type television receiver as explained in Exemplary Embodiment 1 and illustrated in FIG. 1.

In FIG. 3, a screen 3 is installed on a framework 1 that forms a third opening so as to cover the third opening and the screen 3 is fixed on the framework 1 by means of fixing members 2, which press down the periphery of the screen 3 on the framework 1.

The screen 3 is being fixed on the framework 1 with an upper fixing member 2a and a down, left and right fixing member 2b pressing down the screen 3 on the framework 1.

The fixing members 2 are being fixed on the framework 1 by means of screws 10. Accordingly, the work of attaching and detaching the screen 3 on and from the framework 1, respectively, can be performed under a condition where the framework 1 incorporated with or to be incorporated with the screen 3 is detached from the casing 4.

Exemplary Embodiment 3

Figure 4:
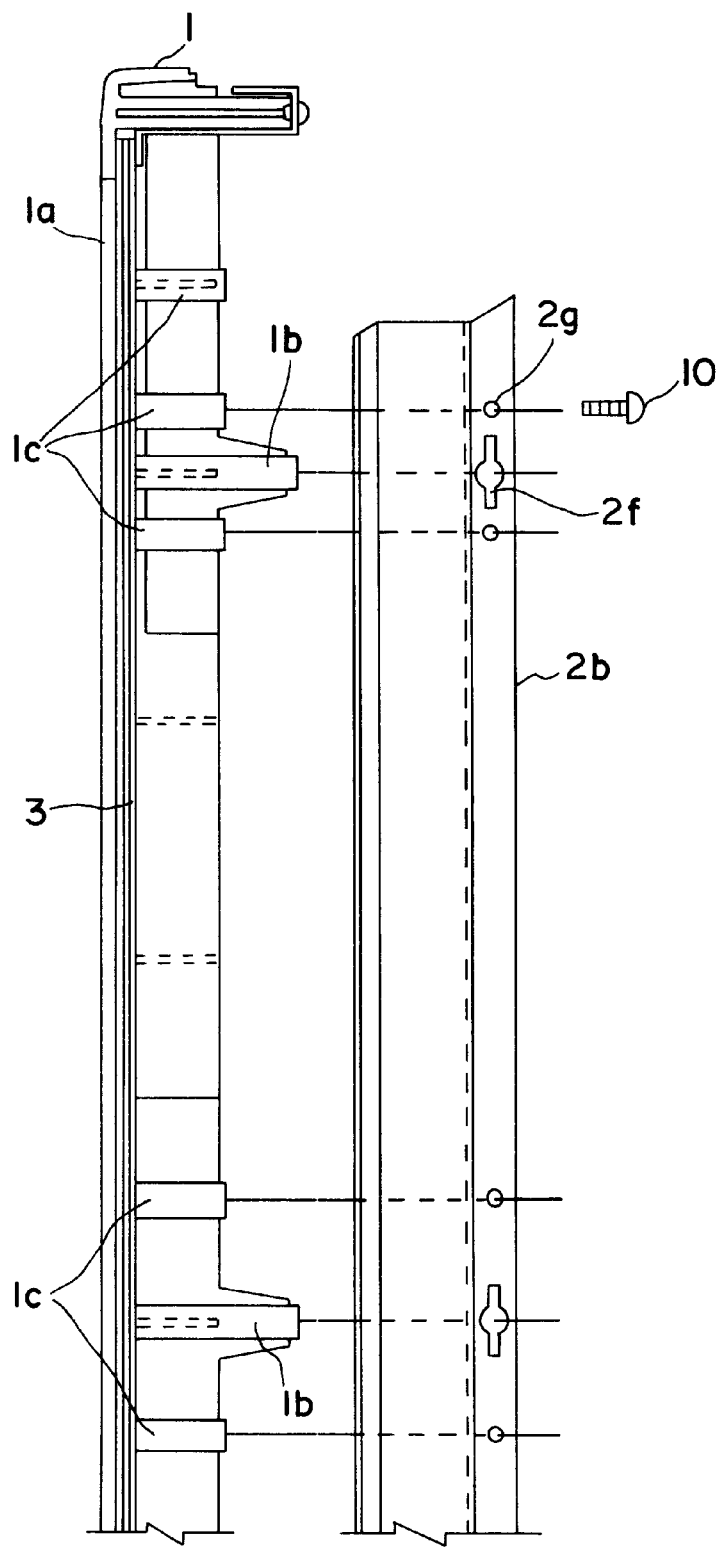
FIG. 4 is a cross-sectional view of an essential section of the framework of the housing structure as shown in FIG. 1.

FIG. 4 illustrates in detail how a framework and a fixing member 2 are put together. In FIG. 4, a framework 1 has long bosses 1b and short bosses 1c formed at specified places thereof.

A fixing member 2b has through holes 2f and screw holes 2g formed at specified places thereof. A screen 3 is pressed on the framework 1 by means of the fixing member 2 and secured to the short bosses 1c formed on the framework 1 by screws 10 that pass through the screw holes 2g formed on the fixing member 2b.

The long bosses 1b of the framework 1 pass through the through holes 2f of the fixing member 2b and mate with ribs 4a formed on a casing 4. (A detailed explanation will be made later.) Thus, the screen 3 is fixed on the framework 1 by means of the fixing member 2.

Exemplary Embodiment 4

Figure 5:
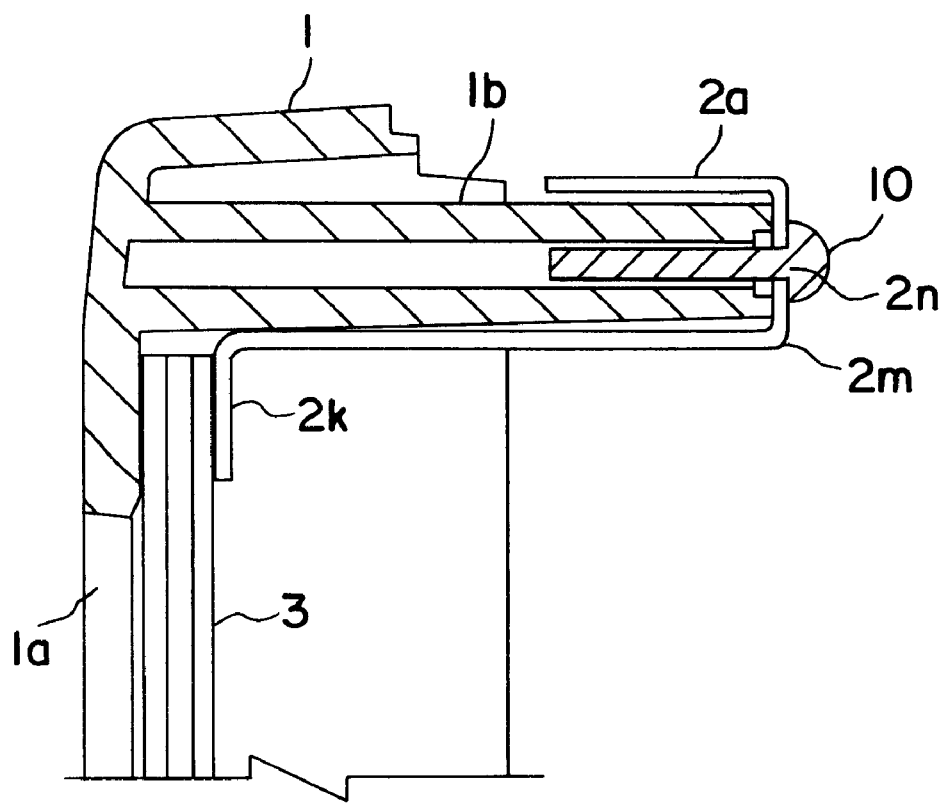
FIG. 5 is an enlarged cross-sectional view of a section of the framework of the housing structure as shown in FIG. 1.

FIG. 5 is an enlarged cross-sectional view of a section of the housing structure where a screen, framework and fixing member are securely put together. In FIG. 5, a screen 3 put together with a fixing member 2a is secured to a boss 1b formed on a framework 1 by a screw 10.

In FIG. 3, FIG. 4 and FIG. 5, the screen 3 is supported at the upper side part of the back thereof by the framework 1 with a fixing member 2a placed in between and at the lower side part, left side part and right side part of the back thereof by the framework 1 with fixing members 2b placed in between, thereby being securely fixed to the framework 1.

The framework 1 has an opening 1a, long bosses 1b and short bosses 1c that are formed on the rim thereof, installation surfaces 1d for mounting the framework 1 to a casing, and holes 1e.

The upper fixing member 2a includes an "L" letter shaped part 2k for fastening the screen 3, a "U" letter shaped part 2m for reinforcing the upper part thereof, and a round hole 2n used in fixing the upper fixing member 2a. Each of the upper side, left side and right side fixing members 2b has a "L" letter shaped part 2k for pressing down the screen 3, a hole 2f through which the long boss 1b passes to reach a mounting surface, and screw holes 2g through which screws 10 pass to secure the fixing member 2 to the framework 1, at the place where the long boss 1b is located on the framework 1. The fixed screen 3 is fastened at the short bosses 1c formed on the framework 1, thereby the screen 3 being supported by the short bosses 1c on the framework 1.

Exemplary Embodiment 5

FIG. 6 is a perspective view of a casing as used in the projection type television receiver shown in FIG. 1.

Figure 6A:
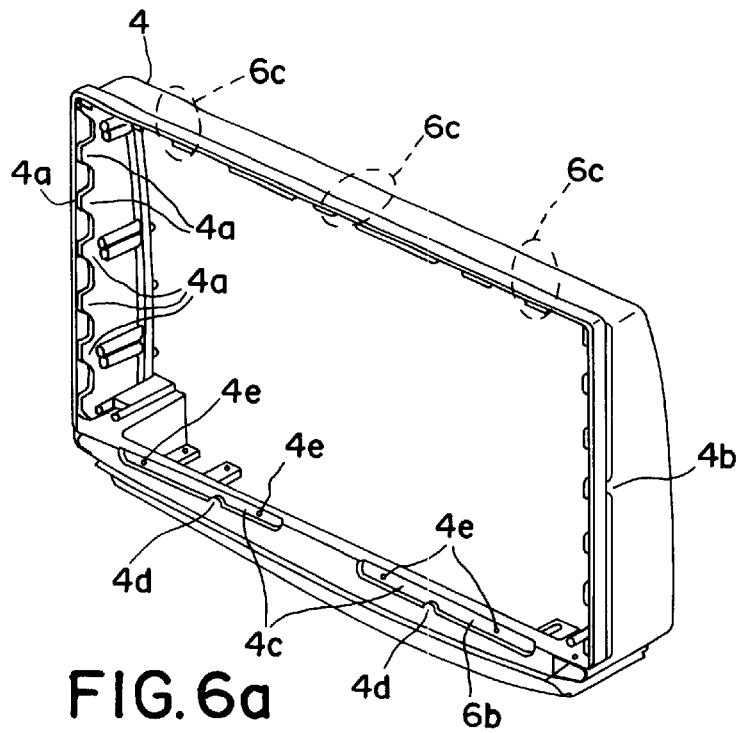
FIG. 6a is a perspective view of a casing of the housing structure as shown in FIG. 1.
Figure 6B:
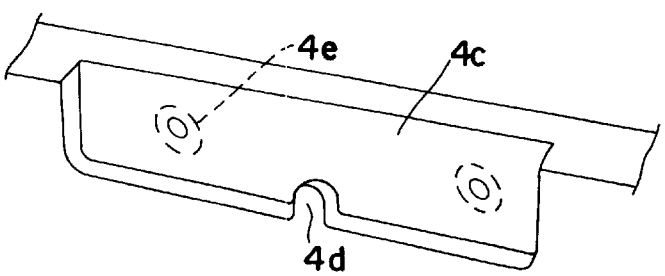
Figure 6C:
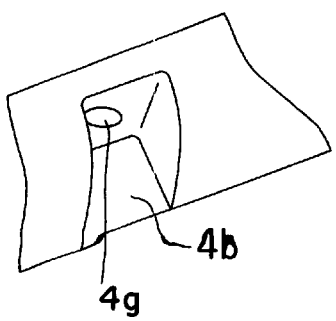

In FIG. 6a, a casing 4 is made of resin. The casing 4 has ribs 4a and screw pits 4b (also shown in FIG. 6c) formed on each of the upper, left and right rims of the front side thereof, and guide ribs 4c, guide ribs 4d and bosses 4e which are also shown in FIG. 6b are formed on the lower rim thereof. Each respective rib 4a has a "U" letter shaped cross-section. The guide ribs 4c serve as guiding means for a screen. The guide ribs 4d serve as positioning means for the screen. The bosses 4e serve as means for securely fixing a frame-work 1.

Figure 7:
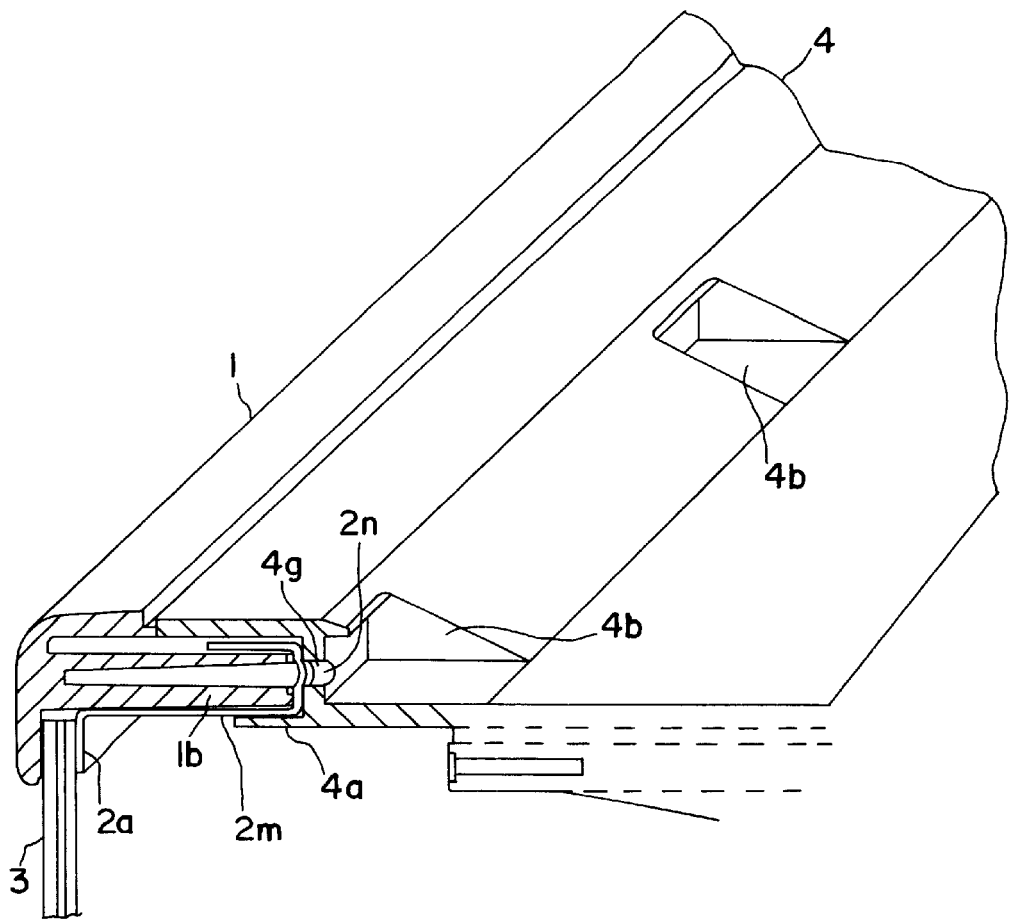
FIG. 7 is a perspective view of an essential upper section of the casing, framework and screen of the housing structure as shown in FIG. 1.
Figure 8:
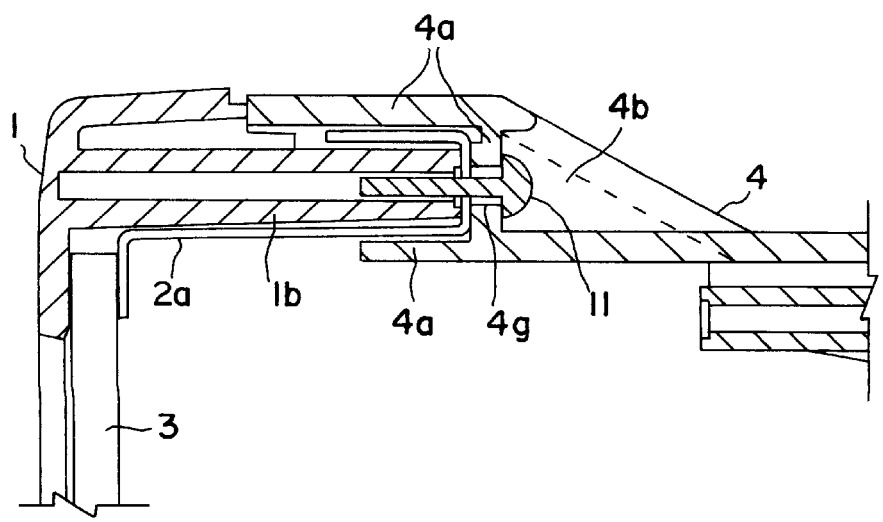
FIG. 8 is an enlarged cross-sectional view of the essential section of FIG. 7.
Figure 9:
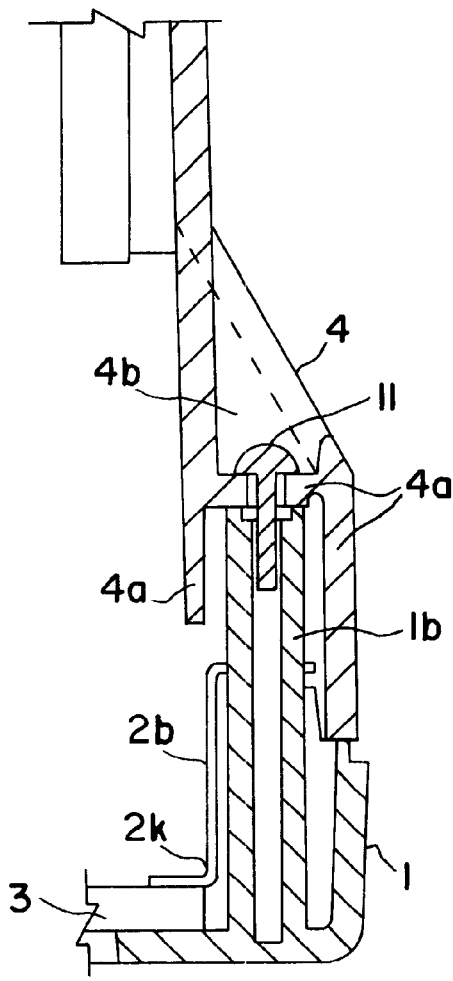
FIG. 9 is a cross-sectional view of an essential right side section of the casing, framework and screen of the housing structure as shown in FIG. 1.
Figure 10:
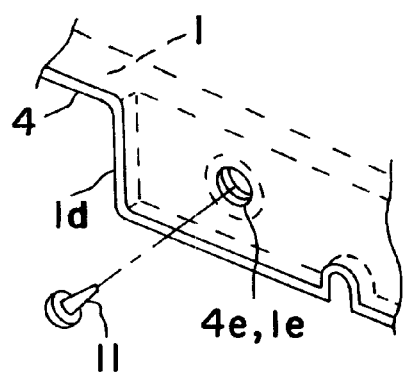
FIG. 10 is a perspective view of an essential lower section of the casing, framework and screen of the housing structure as shown in FIG. 1.

FIG. 7 is a perspective view of an upper section of the casing where the screen and framework are attached thereto, FIG. 8 is a cross-sectional view of FIG. 7, FIG. 9 is a cross-sectional view of a right side section of the casing and FIG. 10 is an enlarged view of a lower part of the casing.

In FIG. 7 and FIG. 8, a "U" letter shaped part 2m of an upper fixing member 2a is engaged with a boss 1b on the rim of an opening provided to the framework 1. In addition, the ribs 4a formed on the casing 4 are engaged with the "U" letter shaped part 2m of the fixing member 2a. Furthermore, a screw 11 is inserted into a round hole 2n and screw hole 4g from the side of the screw pit 4b and secured to the boss 1b. Thus, the screen 3 and framework 1 are mounted on the casing 4 by means of the upper fixing member 2a.

In FIG. 9, the screen 3 is pressed down on the framework 1 by an "L" letter shaped part 2k of a right side fixing member 2b. A long boss 1b formed on the framework 1 is engaged with the rib 4a formed on the casing 4 after passing through a through hole 2f formed on a fixing member 2. The screw 11 is secured to the boss 1b from the side of the screw pit 4b. Thus, the screen 3 and framework 1 are mounted on the casing 4 by means of the right side fixing member 2b.

Likewise, the screen 3 and framework 1 are mounted on the casing 4 by means of a left side fixing member 2b. In the lower section of the front side of the casing 4 as shown in FIG. 10, the boss 4e formed on the casing 4 is engaged with a hole 1e of an installation surface 1d for mounting the framework 1 to the casing 4, and the frame-work 1 that supports the screen 3 is fixed on the casing 4 by the screw 11.

Exemplary Embodiment 6

Figure 11:
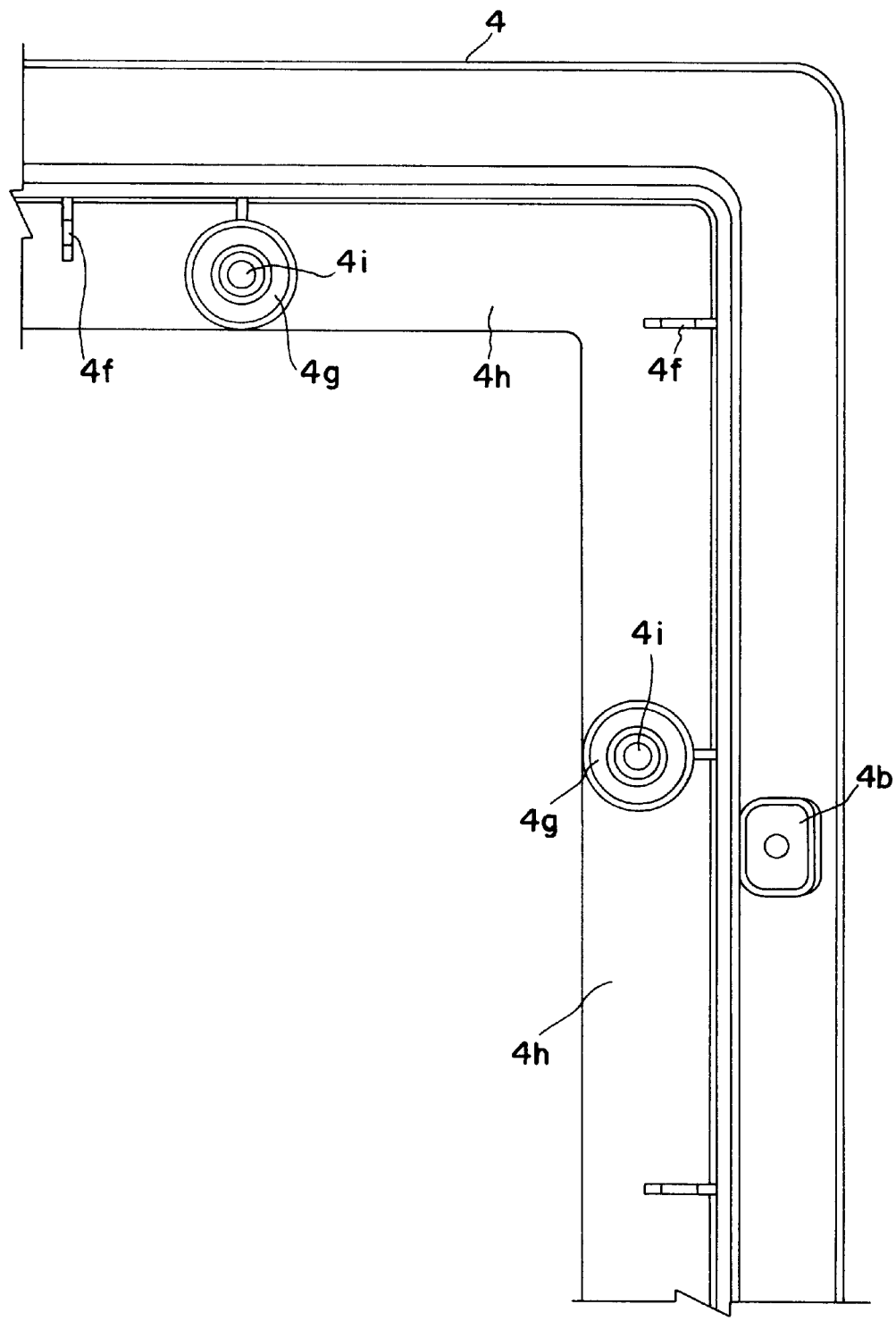
FIG. 11 is a front view of an upper right side section of the casing's back side as shown in FIG. 6.

FIG. 11 is a front view of an essential upper right side section of the casing's back side as was shown in FIG. 6. In FIG. 11, a reinforcing rib 4h is provided on the back side of a casing 4, and a plurality of guide ribs 4f and 4g and holes 4i are formed on the reinforcing rib 4h.

Figure 12:
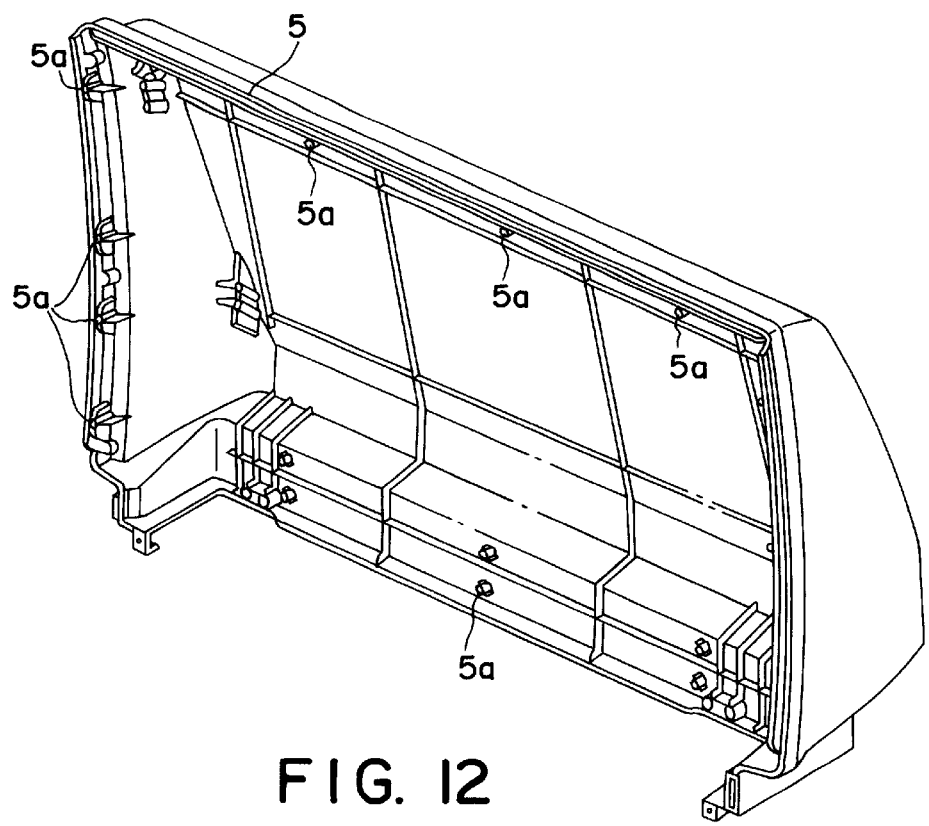
FIG. 12 is a perspective view of the back cover of the housing structure for projection type television receivers as shown in FIG. 1.

FIG. 12 is a perspective view of a back cover as used with the projection type television receiver shown in FIG. 11. In FIG. 12, a plurality of bosses 5a are formed inside of the outer rim of a back cover 5.

Figure 13:
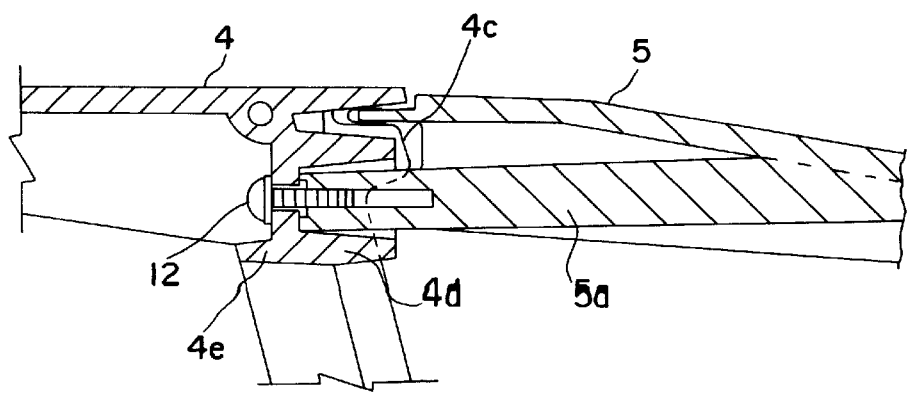
FIG. 13 is a cross-sectional view of an upper section where the back cover is fitted with the casing in the housing structure for projection type television receivers as shown in FIG. 1.

FIG. 13 is a cross-sectional view of an essential upper section where the back cover 5 and casing 4 are engaged with each other. In FIG. 13, the bosses 5a formed on the lower part inside of the outer rim of the back cover 5 are engaged with guide ribs 4c and 4d, and bosses 4e that are formed on the lower section of the casing 4.

Furthermore, the back cover 5 is fixed to the casing 4 by screws 12 that are inserted from the front side of the inside of the casing 4.

In FIG. 11 and FIG. 12, each respective boss 5a formed on the upper side rim, left side rim and right side rim of the back cover 5 is engaged with the corresponding guide rib 4g provided on the casing 4 and both are fastened with each other by a screw (not shown in the drawings) inserted from the front side of the inside of the casing 4.

Accordingly, when the screen 3 is detached from the frame-work 1, the back cover 5 can be readily attached on and detached from the casing 4 from the inside thereof.

Furthermore, by having reinforcing ribs formed on the back of the casing 4, the mechanical strength of the casing 4 is intensified, thereby contributing to an enhanced mounting strength of the back cover 5.

Exemplary Embodiment 7

Figure 14:
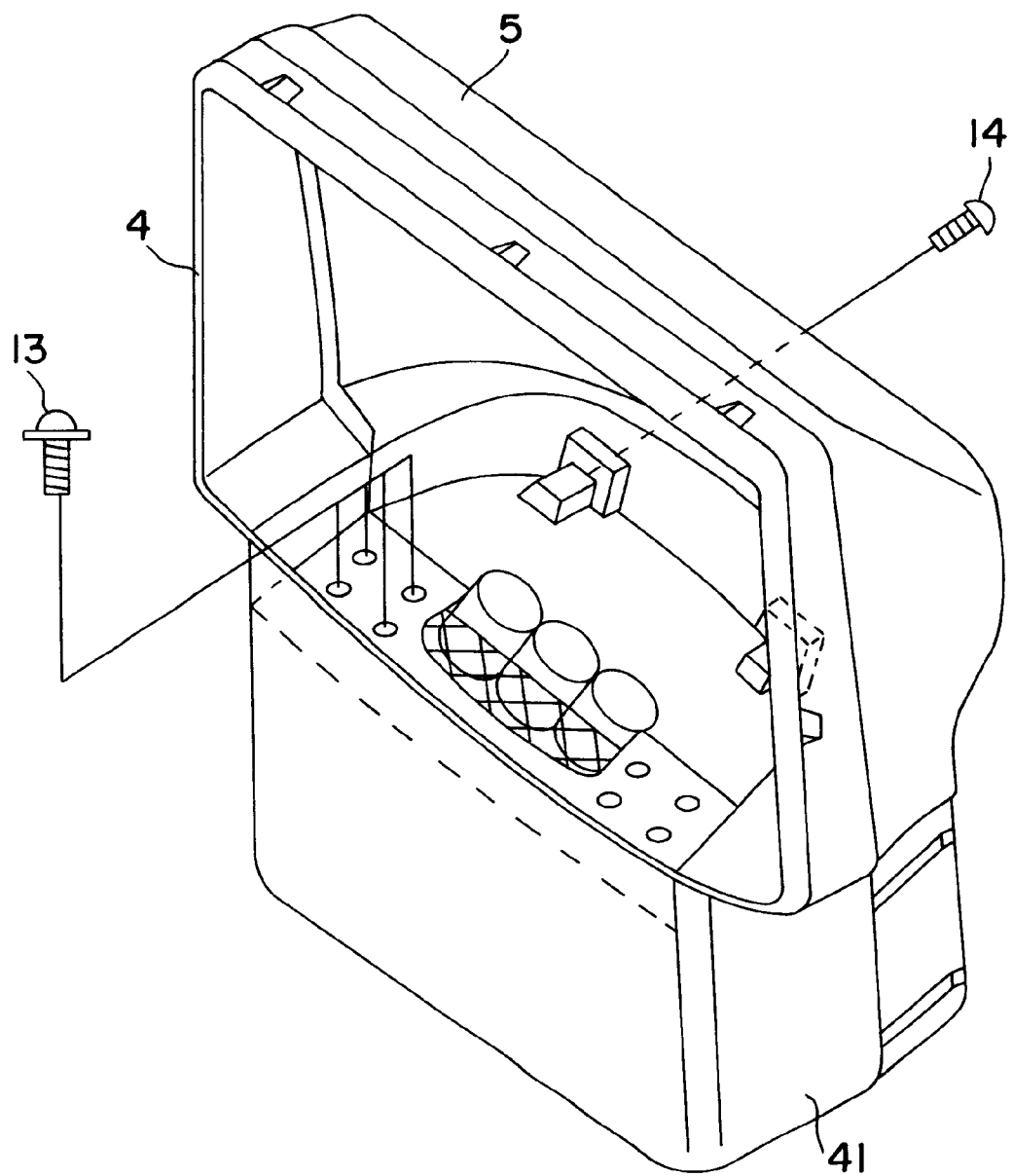
FIG. 14 is a perspective view of the casing, back cover and lower cabinet in the housing structure for projection type television receivers as shown in FIG. 1.

FIG. 14 is a drawing to explain how a casing, back cover and lower cabinet are put together. In FIG. 14, an assembled structure comprising a casing 4 and back cover 5 that are put together according to the method as described in the foregoing Exemplary Embodiment 6 is fixed to a lower cabinet 41 by screws 13 from the inside of the casing 4 and additionally by screws 14 from the back side of the casing 4. Thus, the casing 4 and back cover 5 are fixed to the lower cabinet 41.

Exemplary Embodiment 8

According to the present invention, it is also possible to fabricate a casing 4 and back cover 5 into single-piece construction.

In FIG. 1 and FIG. 14, the foregoing single-piece construction allows a framework 1 to be attached on and detached from the casing 4 and back cover 5 that have been already put together with a lower cabinet 41.

Furthermore, it is made possible that the whole single-piece construction comprising the casing 4 and back cover 5 is attached on and detached from the lower cabinet 41.

Exemplary Embodiment 9

Figure 15:
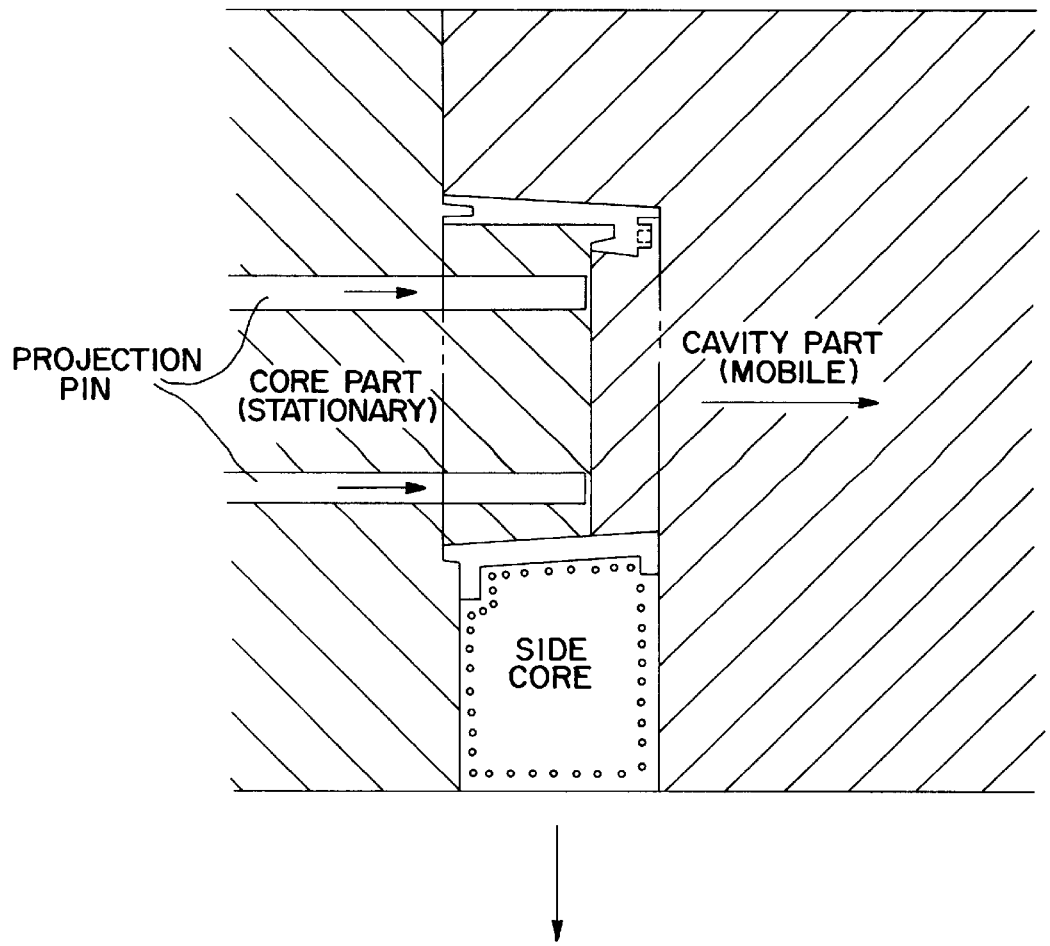
FIG. 15 is a cross-sectional view of a section of a molding die for fabrication of a casing in an exemplary embodiment of the present invention of a fabrication method for the housing structure of projection type television receivers.
Figure 16:
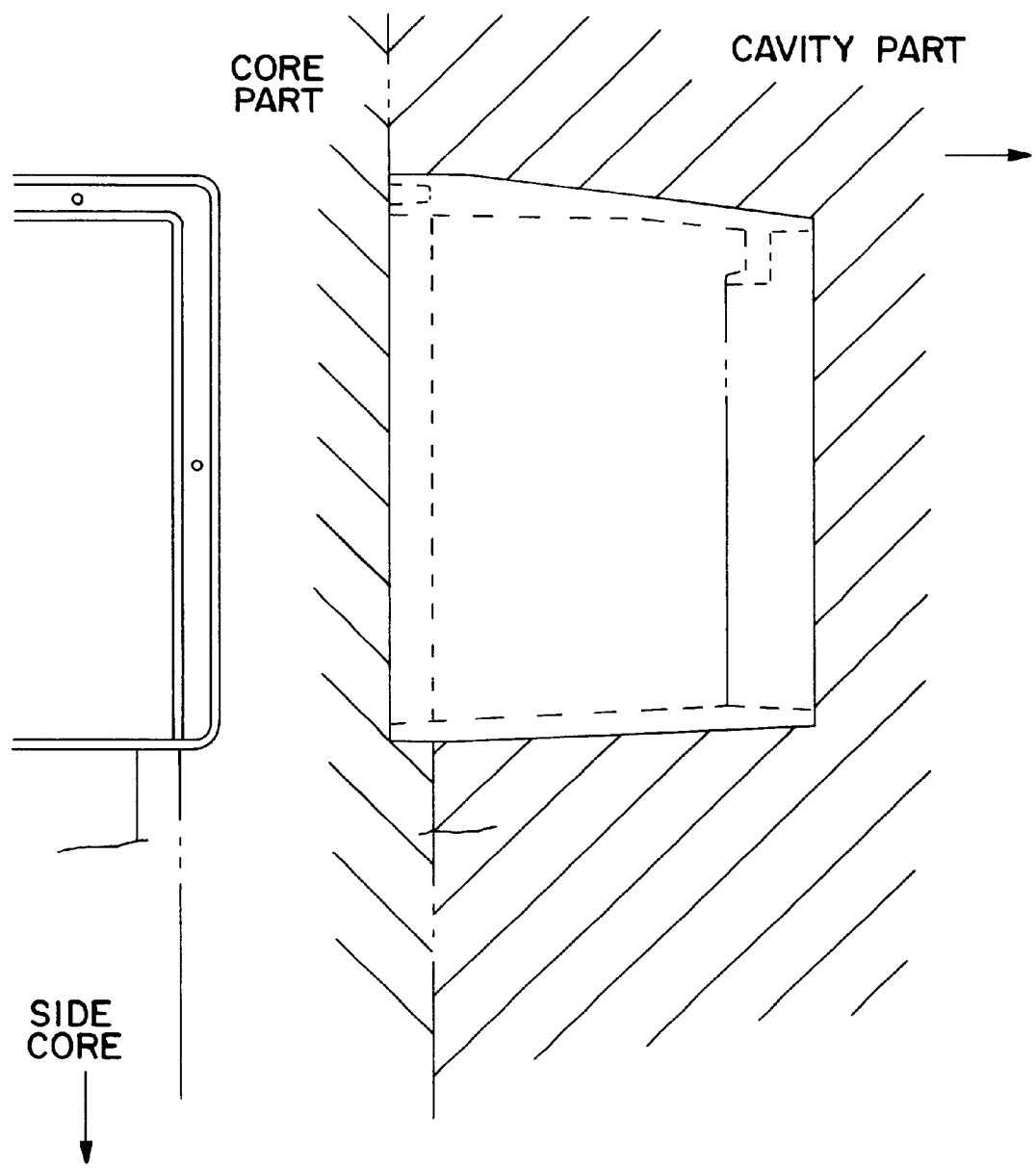
FIG. 16 is a cross-sectional view of a molding die's essential section for explaining the structure of the molding die as shown in FIG. 15.
Figure 17:
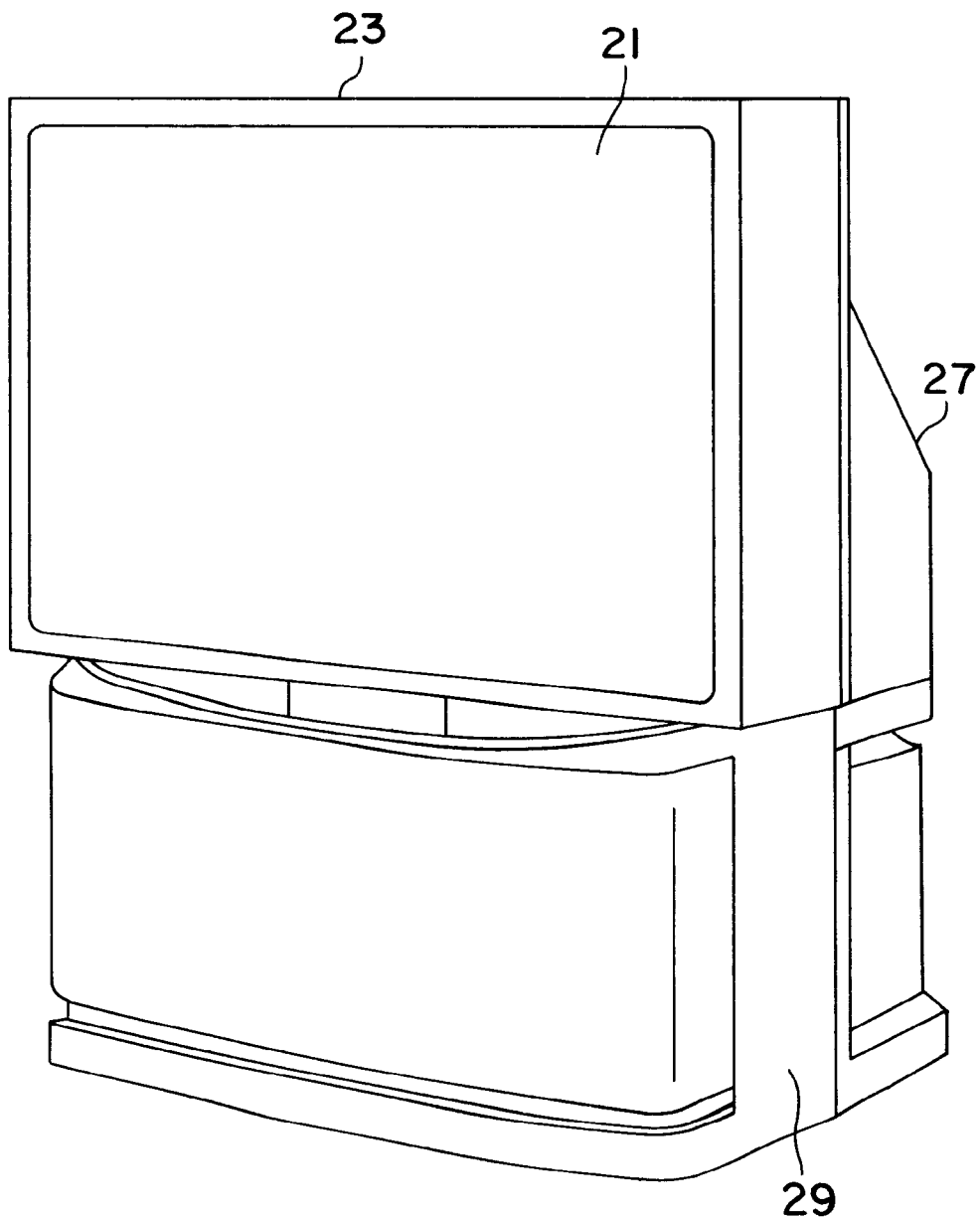
FIG. 17 is a perspective view of a prior art housing structure for projection type television receivers.
Figure 18:
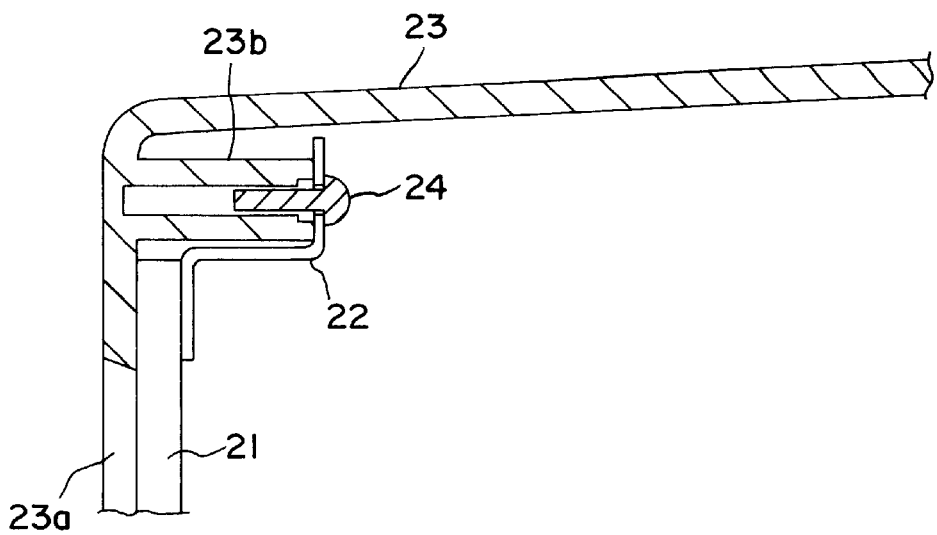
FIG. 18 is a cross-sectional view of a section of the housing structure as shown in FIG. 17.
Figure 19:
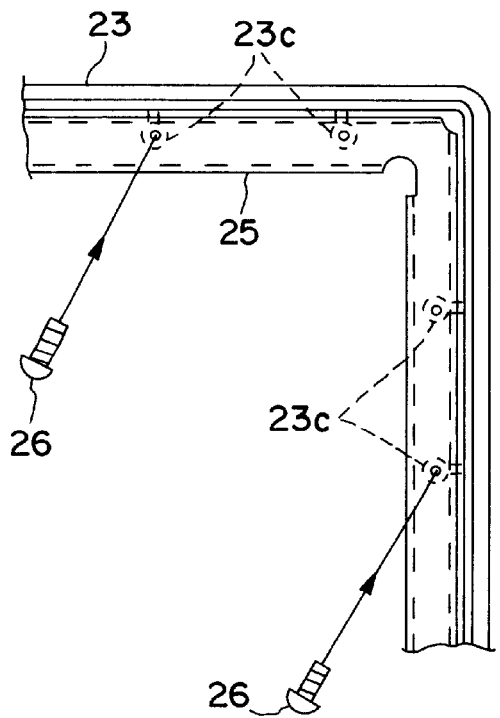
FIG. 19 is a front view of a section of the back side of a casing used in the housing structure as shown in FIG. 17.
Figure 20:
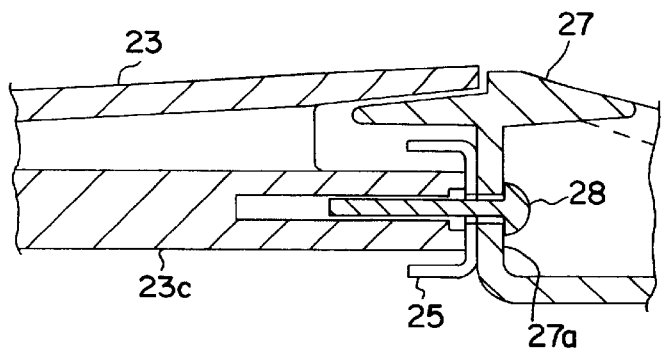
FIG. 20 is a cross-sectional view of a section where the casing is fitted with the back cover in the prior art housing structure for projection type television receivers as shown in FIG. 17.

FIG. 15 and FIG. 16 are cross-sectional views to explain the structure of a molding die for fabrication of a resin-made casing of the present invention used in projection type television receivers. In FIG. 15 and FIG. 16, a first opening on the front side of a casing is located at the core part (i.e., the fixed side) of a molding die, a second opening on the back side of the casing is located at the cavity part of the molding die and the bottom of the casing is located at the side core part of the molding die.

Using a molding die of the foregoing construction, a casing is fabricated by injection molding. Thus, it becomes possible to fabricate readily a casing having a heavier wall thickness for the back side thereof than the wall thickness of the front side.

Figure 21:
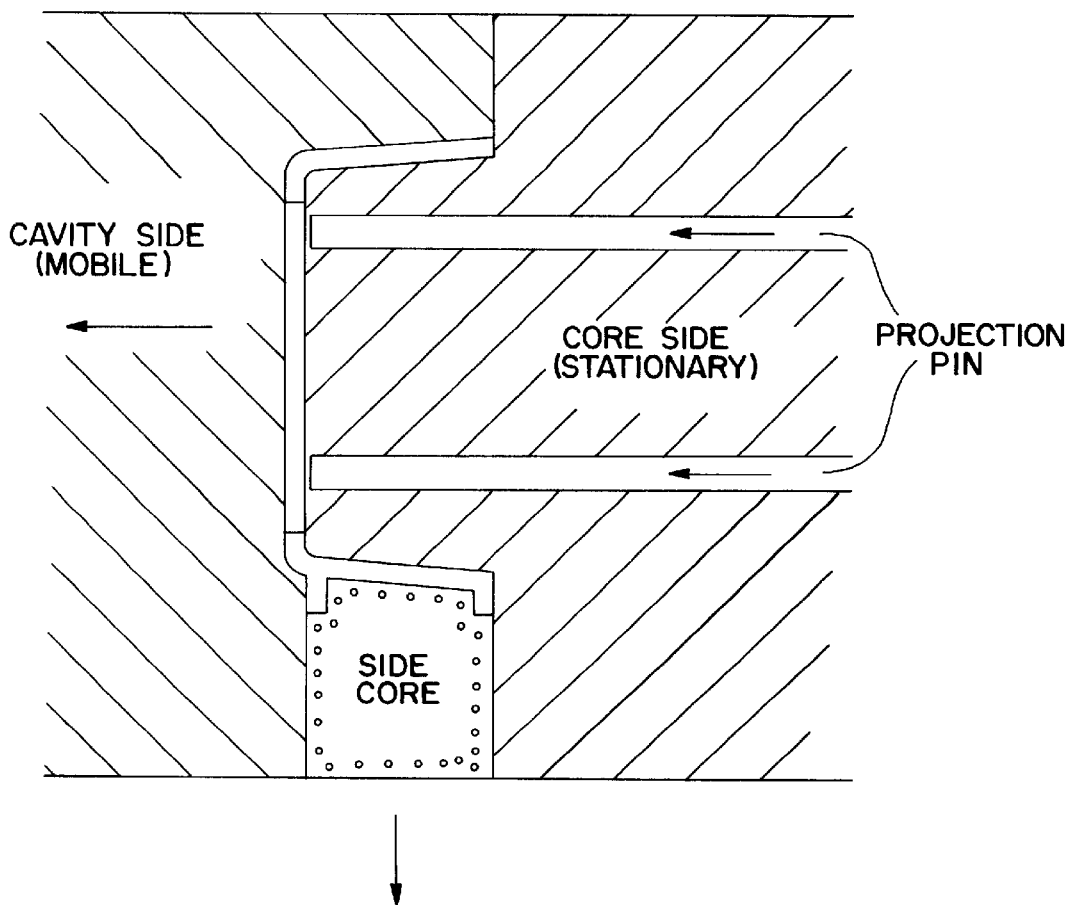
FIG. 21 is a cross-sectional view of a section of a molding die for fabrication of a casing in an example of the prior art fabrication method for the housing structure of projection type television receivers.
Figure 22:
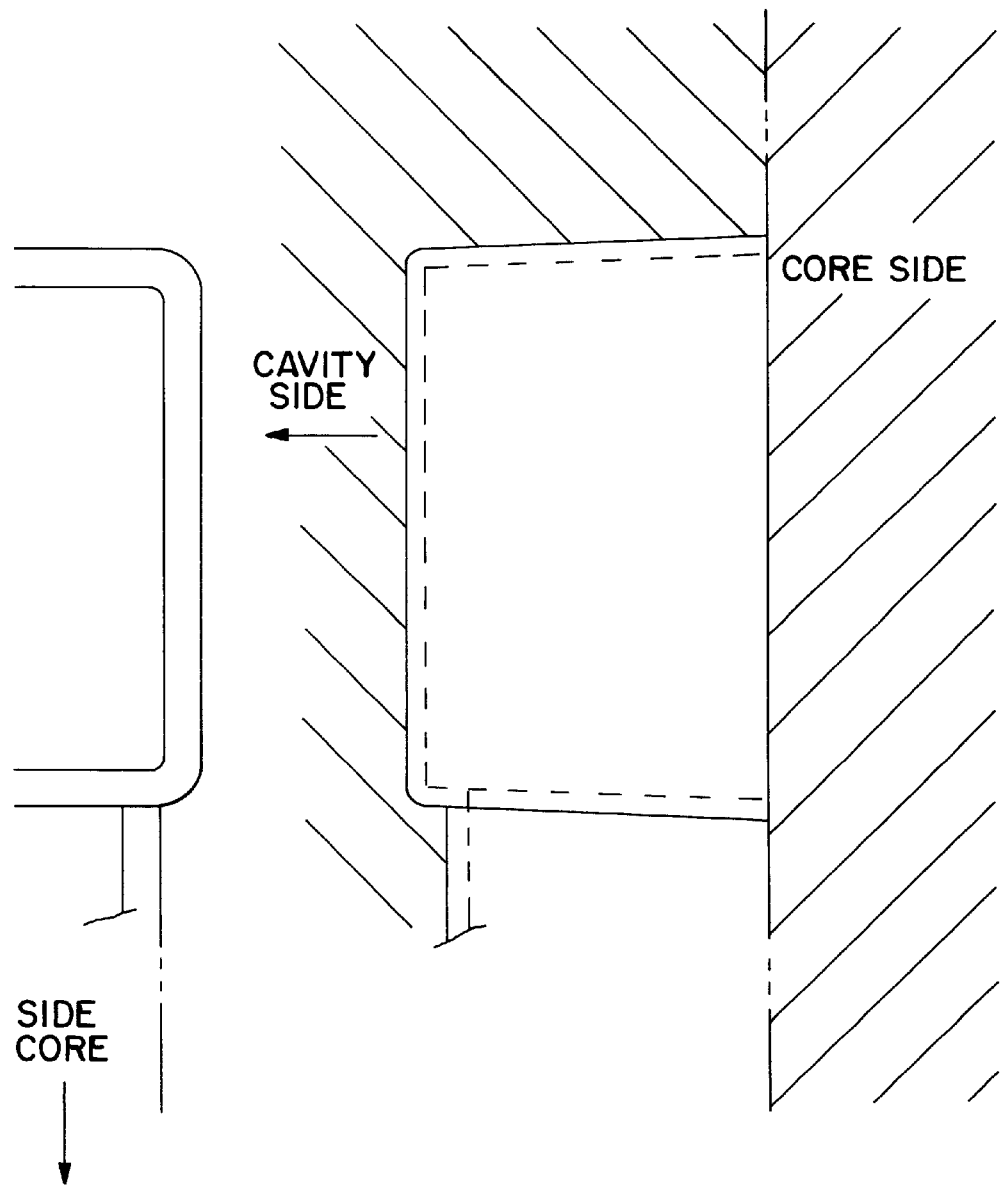
FIG. 22 is a cross-sectional view of a molding die's essential section for explaining the structure of the molding die as shown in FIG. 21.

Furthermore, it is made possible to fabricate easily a casing having reinforcing ribs. In addition, it becomes possible to fabricate readily a casing having "U" letter shaped ribs formed on the upper side, left side and right side of the inside rim of a first opening on the front side thereof, respectively, and having guide ribs formed on the lower side of the inside rim of the first opening on the front side thereof. A cross-sectional view of a spectrum of a molding die for fabrication of a casting in an example of the prior art fabrication method for the housing structure of projection type television receivers is shown in FIG. 21 and FIG. 22.

As described in the foregoing, the structures disclosed by the present invention bring about such effects as follow:

With a large projection type television receiver wherein a screen is used, when scratches are found on the screen and an inspection of the screen is required after a long use, it is made possible for the screen to get detached from the front side of the projection type television receiver without requiring the back cover to be detached from the casing. Therefore, the efficiency of the work required in replacement, inspection and maintenance service of screens is remarkably enhanced.

Further, in the assembly work of projection type television receivers, a casing and back cover can be easily put together and held down securely. As a result, the work efficiency is greatly enhanced and the production steps are reduced.

In addition, when it comes to discarding or dismantling projection type television receivers, the separation of screens, frameworks, casings and back covers from one another is made easier, thereby facilitating the recycling of materials.

Moreover, a screen can be detached from the front side without moving a projection type television receiver in the household of a user, and the work of mounting a reflector that is installed inside the casing and adjusting the angles and positions of the reflector can be performed easily. The work of molding a casing that is provided with an optimum strength is made simple, resulting in facilitating the production of a thin upper cabinet having an excellent design.

Furthermore, casings are fabricated by the use of a molding die wherein positions of cavity and core are reversed when compared with an ordinary molding die and it is made possible to fabricate casings provided with reinforcing ribs using the same molding machine as used before. Therefore, the casings thus fabricated no longer require reinforcing metal fixtures, resulting in achieving a reduction of product weight without sacrificing the mechanical strength of the casings.

What is claimed is:

1. A method of fabricating a housing structure for a projection television receiver comprising the steps of:
   i) forming a casing with a first opening formed on a front side thereof and a second opening formed on the back side thereof by:
      a) providing a resin molding die for forming said casing, said resin molding die having a core part, a side core part, and a cavity part, in which said first opening is located on the core part of said molding die, said second opening is located on the cavity part of said molding die and a bottom side of said casing is located on the side core part of said molding die, said bottom side including a third opening sufficiently sized to accommodate an image projected therethrough; and
      b) introducing resin into said die and allowing said resin to cool; and
   ii) installing a square-shaped framework on the front side of said casing, said square-shaped framework provided with a fourth opening, said casing and said square-shaped framework adapted for retaining a screen therebetween, said screen being detachable from said casing through said first opening, said screen covering said fourth opening.

2. The housing structure fabrication method according to claim 1, wherein said casing has a greater wall thickness on the back side thereof than on the front side thereof.

3. The housing structure fabrication method according to claim 1, wherein
   said casing has a greater wall thickness on the back side thereof than on the front side and includes a rim surrounding said first opening, said rim having a top portion, a bottom portion, and left and right portions;
   "U" shaped ribs are formed on the top portion, the left portion and the right portion; and
   guide ribs are formed on the bottom portion.

4. The method as in claim 1, in which said step of introducing resin comprises injection molding.

5. The method as in claim 1, in which said screen is detachable from said framework.

* * * * *